US008011287B2

(12) United States Patent
Fezer

(10) Patent No.: US 8,011,287 B2
(45) Date of Patent: Sep. 6, 2011

(54) PIN BOSSES OF A PISTON FOR AN INTERNAL COMBUSTION ENGINE

(75) Inventor: Eberhard Fezer, Rudersberg-Steinenberg (DE)

(73) Assignee: MAHLE International GmbH, Stuttgart (DE)

(*) Notice: Subject to any disclaimer, the term of this patent is extended or adjusted under 35 U.S.C. 154(b) by 421 days.

(21) Appl. No.: 12/225,903

(22) PCT Filed: Mar. 23, 2007

(86) PCT No.: PCT/DE2007/000535
§ 371 (c)(1),
(2), (4) Date: Oct. 20, 2008

(87) PCT Pub. No.: WO2007/115527
PCT Pub. Date: Oct. 18, 2007

(65) Prior Publication Data
US 2009/0114087 A1 May 7, 2009

(30) Foreign Application Priority Data
Apr. 4, 2006 (DE) .......................... 10 2006 015 586

(51) Int. Cl.
*F16J 1/14* (2006.01)
(52) U.S. Cl. ...................................................... 92/187
(58) Field of Classification Search .................... 92/187
See application file for complete search history.

(56) References Cited

U.S. PATENT DOCUMENTS

| 4,124,010 | A | * | 11/1978 | Fiedler ........................ 123/193.6 |
| 5,112,145 | A | | 5/1992 | MacGregor |
| 5,653,156 | A | | 8/1997 | Issler et al. |
| 5,746,169 | A | | 5/1998 | Issler et al. |
| 5,934,766 | A | | 8/1999 | Feigel et al. |
| 7,107,893 | B2 | | 9/2006 | Weinkauf et al. |
| 7,305,960 | B2 | | 12/2007 | Zvonkovic |
| 7,647,863 | B2 | * | 1/2010 | Issler et al. ........................ 92/187 |
| 2007/0204746 | A1 | | 9/2007 | Issler et al. |

FOREIGN PATENT DOCUMENTS

| DE | 2 152 462 | 4/1973 |
| DE | 30 36 062 | 4/1982 |
| DE | 41 11 368 | 1/1992 |
| DE | 43 27 772 | 2/1995 |

(Continued)

OTHER PUBLICATIONS

International Search Report.

*Primary Examiner* — Michael Leslie
(74) *Attorney, Agent, or Firm* — Collard & Roe, P.C.

(57) ABSTRACT

Pin bosses (1) are proposed for the piston (2) of an internal combustion engine, having in each case one pin bore (3) which has a zenith-side ovality in the region (15) of the bore center (7), wherein the zenith-side ovality of the pin bore (3) increases starting from the bore center (7) radially to the outside and radially to the inside, and the nadir-side ovality increases starting from the bore center (7) radially to the inside. As a result, the shape of the pin bore (3) is adapted to every load-dependent deformation of the piston pin. As a result of this, in addition, the lubrication of the piston pin is improved in the region of the bore center (7).

4 Claims, 1 Drawing Sheet

FOREIGN PATENT DOCUMENTS

Figure 1:
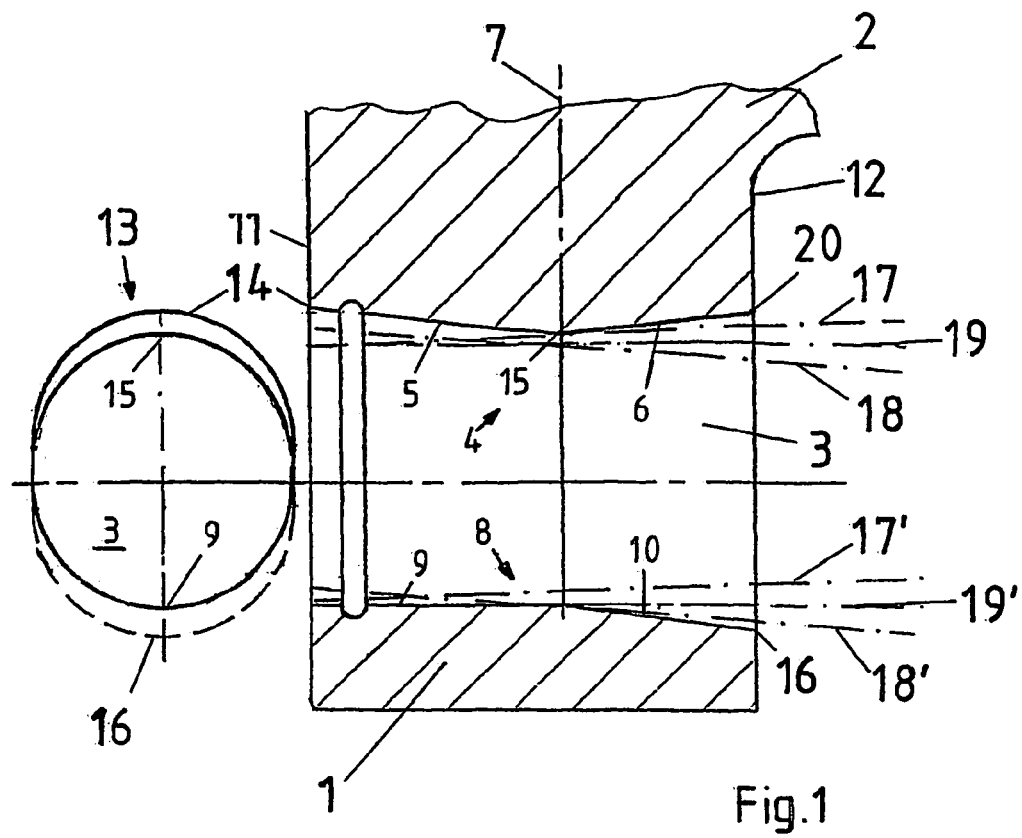

| | | |
|---|---|---|
| DE | 44 41 150 | 5/1996 |
| DE | 102 31 233 | 2/2004 |
| DE | 10 2004 008 097 | 9/2005 |
| GB | 1 405 959 | 9/1975 |
| JP | 62-184274 | 8/1987 |
| JP | 10-103513 | 4/1998 |
| JP | 11-303993 | 11/1999 |
| JP | 2004-028025 | 1/2004 |
| WO | WO 96/07841 | 3/1996 |
| WO | WO 03/098078 | 11/2003 |
| WO | WO 2004/008006 | 1/2004 |
| WO | WO 2007/025733 | 3/2007 |

* cited by examiner

PIN BOSSES OF A PISTON FOR AN INTERNAL COMBUSTION ENGINE

CROSS REFERENCE TO RELATED APPLICATIONS

This application is the National Stage of PCT/DE2007/000535 filed on Mar. 23, 2007, which claims priority under 35 U.S.C. §119 of German Application No. 10 2006 015 586.6 filed on Apr. 4, 2006. The international application under PCT article 21(2) was not published in English.

The present invention relates to pin bosses of a piston for an internal combustion engine, having pin bores for mounting a piston pin in the shape of a circular cylinder.

Pin bosses of a piston for an internal combustion engine are known from the Offenlegungsschrift [examined patent application published for public scrutiny] DE 44 41 150 A1, which have a pin bore, in each instance, whose zenith-side ovality and nadir-side ovality, proceeding from the center of the bore, increase radially inward. It is a disadvantage, in this connection, that the center of the bore is configured in the shape of a circular cylinder, so that lubrication of the piston pin is deficient in the region of the center of the bore, and here, there is the risk of damage to the pin bore and to the piston pin, specifically during a cold start.

It is known from the PCT application WO 2004/008006 A1, to provide the pin bores of the pin bosses with a zenith-side ovality, radially on the outside. But neither the center of the bore nor the nadir region of the pin bore that lies radially on the inside have an oval cross-section shape, and this brings with it not only lubrication problems of the piston pin in the region of the center of the bore, but the further disadvantage that in the case of tensile stress on the piston pin, during which its center part experiences deformation in the direction facing away from the piston crown, the piston pin is pressed onto the inner nadir region of the pin bore, and this can lead to damage to this bore region and to pin boss friction, particularly during a cold start.

It is the task of the invention to avoid the stated disadvantages of the state of the art.

This task is accomplished with pin bores that have a zenith-side ovality in the region of the center of the bore, whereby the zenith-side ovality of the pin bores increases radially inward and radially outward, proceeding from the center of the bore, and furthermore, the nadir-side ovality increases radially inward, proceeding from the center of the bore. In this connection, the shape of the pin bore is adapted to every temperature-related and stress-dependent deformation of the piston and of the piston pin. Furthermore, a gap remains between the piston pin and the pin bore, when the piston pin is unstressed and therefore not deformed, in the center of the bore, because of the residual ovality of the zenith, in which gap lubricant oil collects, which guarantees good lubrication of the pin, particularly during a cold start.

Practical embodiments of the invention are the object of the dependent claims.

Figure 2:
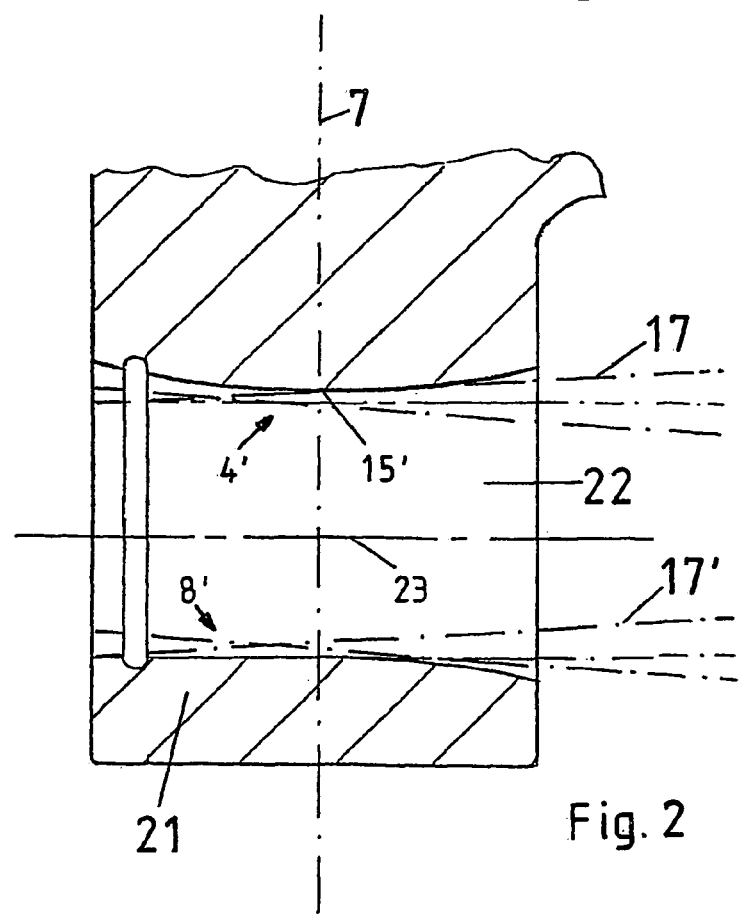

Some exemplary embodiments of the invention will be described in the following, using the drawings. These show:

FIG. 1 an exemplary embodiment of a pin boss having a pin bore, in section, in which the ovality of the bore zenith increases radially inward and radially outward, proceeding from the center of the bore, and furthermore, the ovality of the nadir of the pin bore increases radially inward, in linear manner, and FIG. 2 an exemplary embodiment of a pin boss having a pin bore, in section, in which the ovality of the bore zenith increases radially inward and radially outward, proceeding from the center of the bore, and furthermore, the ovality of the nadir of the pin bore increases radially inward, in such a manner that both the zenith and the nadir are configured to be curve-shaped in section, in each instance, i.e. have the shape of a traverse.

FIG. 1 shows a sectional diagram of a pin boss 1 of a piston 2 for an internal combustion engine, having a pin bore 3. The zenith 4 of the pin bore 3 has a radially outside region 5 and a radially inside region 6. Proceeding from the center 7 of the bore, the ovality of the region 5 increases radially outward, and the ovality of the region 6 increases radially inward, in linear manner. In the region of the center 7 of the bore, the zenith 4 of the bore 3 demonstrates a residual ovality.

The nadir 8 of the pin bore 3 has a region 9 that lies radially on the outside, proceeding from the center 7 of the bore, which region is configured in the shape of a semicircle, in section, crosswise to the pin bore 3. In addition, the nadir 8 has a region 10 that lies radially on the inside, whose ovality increases, in linear manner, proceeding from the center 7 of the bore. In this connection, the ovalities of the regions 5, 6, and 10 of the pin bore 3 can increase in different measure.

The ovality of the regions 5, 6, and 10 of the pin bore 3 is shown with great magnification in FIG. 1, and has an increase in size of the greater axis of ovality, relative to the circular shape, by 10 μm to 50 μm at the radially outer 11 and radially inner face surface 12 of the pin boss 1. Depending on the type and size of the piston, the increase in size of the greater axis of ovality, relative to the circular shape, can also be greater than 50 μm or less than 10 μm.

13 refers to a top view of the outer face surface 11 of the pin boss 1, which shows the upper edge 14 of the pin bore 3, with maximal ovality of the region 5 of the zenith 4 of the pin bore 3 that lies radially on the outside, the pin bore 3 in the region 15 of the center 7 of the bore with zenith-side residual ovality, the nadir region 9 of the pin bore 3 that lies radially on the outside, and has the shape of a semicircle, and, with a broken line, the lower edge 16 of the pin bore 3, with maximal, nadir-side ovality, which lies radially on the inside.

In FIG. 1, a piston pin disposed in the pin bore 3 is shown with a dot-dash line; its deformations under the different stresses of the piston 2 are shown with great magnification. Thus, the lines 17, 17' show the piston pin deformed under the maximal pressure stress on the piston 2 during the explosion cycle, whereby the center of the pin experiences deformation in the direction of the piston crown. The lines 18, 18' show the piston pin when it is exposed to a tensile stress that proceeds from the connecting rod, during the intake cycle, because of the mass inertia force of the piston 2, so that its center deforms in the direction facing away from the piston crown. The lines 19, 19' show the unstressed piston pin.

In this connection, the shape of the pin bore 3 is adapted to every stress-dependent deformation of the piston pin. If the piston pin is deformed in accordance with the lines 17, 17', because of the pressure stress that occurs during the explosion cycle, the piston pin lies against the ovality of the zenith region 6 that increases radially inward from the center 7 of the bore, thereby preventing material stresses from proceeding from the zenith-side edge 20 of the pin bore 3 that lies radially on the inside, which stresses, together with the very great pressure stresses that occur, particularly in the case of a diesel engine, can lead to damage to the piston crown and to the combustion bowl disposed in the piston crown.

In the case of a deformation of the piston pin due to tensile stress on the piston pin that proceeds from the connecting rod, in accordance with the lines 18, 18', the piston pin lies against the ovality of the nadir region 10, which lies radially on the inside and increases from the center 7 of the bore. In this way, it is prevented that a material stress is exerted by the piston pin on the edge 16 of the nadir region of the pin bore that lies radially on the inside, which stress can lead to damage to the inner region of the pin bore. However, direct contact between piston pin ad pin bore 3 is avoided, in this connection, so that a sufficiently large gap always remains between piston pin and pin bore, in which lubricant oil can collect and ensure sufficient lubrication of the piston pin.

The residual ovality of the zenith 4 of the pin bore 3 that is present in the center 7 of the bore has the advantage that here, a gap forms between the unstressed piston pin 19, 19' and the zenith 4 of the bore 3, in which gap lubricant oil collects, which guarantees good lubrication of the piston pin, particularly during a cold start, if the piston pin deforms in this connection, as shown by means of the lines 17, 17'.

FIG. 2 shows an exemplary embodiment of the pin boss 21 having a pin bore 22, in section, in which the ovality of the bore zenith 41 increases radially inward and radially outward, proceeding from the center 7 of the bore, and furthermore, the ovality of the nadir 8' of the pin bore 22 increases radially inward, in such a manner that both the zenith 4' and the nadir 8' are configured to be curve-shaped in section along the bore axis 23, in each instance, i.e. have the shape of a traverse. In this connection, the ovalities of the nadir 8' and of the zenith 4' of the pin bore 22 can increase in different measure.

Since the zenith region 15 of the pin bore 3 according to FIG. 1, which comes to a point, and the zenith region 15' of the pin bore 22 according to FIG. 2, which runs in curve shape in section, along the bore axis 23, are pressed onto the upper region of the piston pin with great force during great pressure stress on the piston 2, within the framework of the explosion cycle and during deformation of the piston pin according to the lines 17, 17', plastic deformation of the piston material occurs in the regions 15 and 15', so that here, the piston pin and the pin bore 3, 22 adapt to one another, in terms of shape. Since the contact region 15 in the embodiment of the pin bore according to FIG. 1 is configured more in point form, a very good surface pressure of the zenith 4 of the pin bore 3 onto the piston pin occurs here. Since the pin bore 22 according to FIG. 2 is configured to be curve-shaped or in the form of a traverse, in the center region 15', the resulting contact surface that occurs in the deformed region 15' is thereby increased, thereby also decreasing the surface pressure of the region 15' of the pin boss 21 and of the piston pin, and this brings about a reduction in the risk of damage to the pin boss 21 in the center region 15'.

REFERENCE SYMBOL LIST 1 pin boss
2 piston
3 pin bore
4, 4' zenith of the pin bore
5 region of the pin bore that lies radially on the outside
6 region of the pin bore that lies radially on the inside
7 center of the bore
8, 8' nadir of the pin bore 3
9 region of the nadir of the pin bore 3 that lies radially on the outside
10 region of the nadir of the pin bore 3 that lies radially on the inside
11 radially outer face surface of the pin boss 1
12 radially inner face surface of the pin boss 1
13 top view of the radially outer face surface of the pin boss 1
14 edge of the zenith of the pin bore 3 that lies radially on the outside
15, 15' center region of the zenith of the pin bore 3
16 edge of the nadir of the pin bore 3 that lies radially on the inside
17, 17' piston pin after deformation during the explosion cycle
18, 18' piston pin after deformation under tensile stress
19, 19' unstressed piston pin
20 edge of the zenith of the pin bore 3 that lies radially on the inside
21 pin boss
22 pin bore
23 bore axis

The invention claimed is:

1. A pin boss of a piston for an internal combustion engine, comprising:
   a pin bore for mounting a piston pin, said pin bore being configured in the form of a circular cylinder, which has a zenith-side ovality in a region of a center of the bore, wherein the zenith-side ovality of the pin bore increases radially outward and radially inward, proceeding from the center of the bore, and a nadir-side ovality increases radially inward, proceeding from the center of the bore.

2. The pin boss according to claim 1, wherein the zenith-side ovality of the pin bore increases radially outward and radially inward, proceeding from the center of the bore, and the nadir-side ovality increases radially inward, in a linear manner.

3. The pin bosses according to claim 1, wherein the zenith and the nadir of the pin bore are configured in curve shape, viewed in section along the bore axis.

4. The pin boss according to claim 1, wherein the zenith and the nadir of the pin bore have the shape of a traverse, viewed in section along the bore axis.

* * * * *